June 29, 1965 C. C. IH 3,192,399
AMPLIFIER-SWITCHING CIRCUIT EMPLOYING PLURALITY OF CONDUCTING DEVICES TO SHARE LOAD CURRENT
Filed Dec. 11, 1961
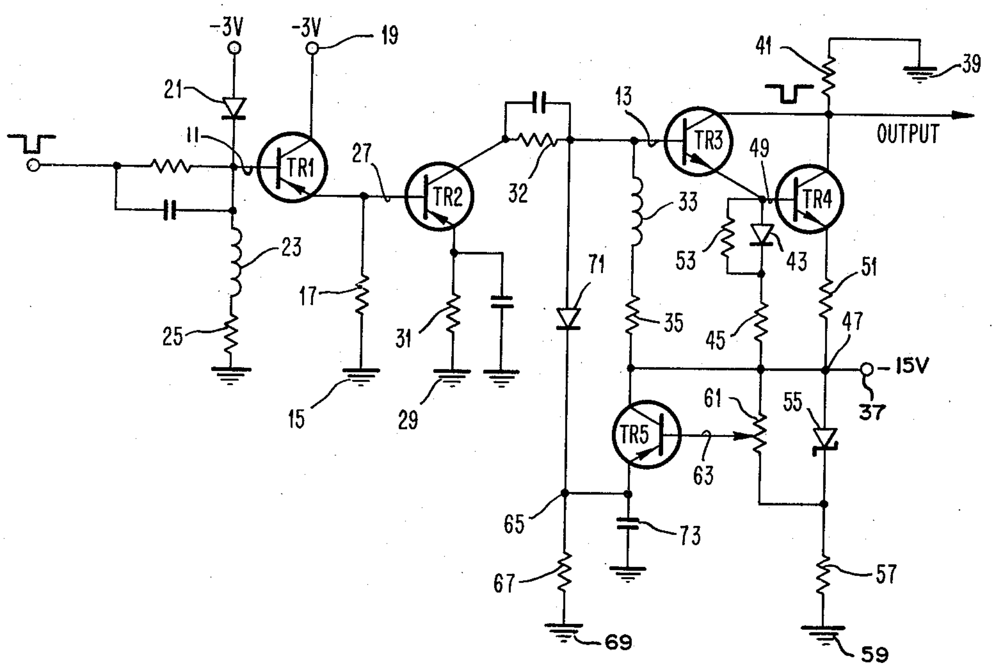
*INVENTOR*
CHARLES C. IH
BY William E. Cleaver
*ATTORNEY*

United States Patent Office 3,192,399

Patented June 29, 1965

3,192,399

AMPLIFIER-SWITCHING CIRCUIT EMPLOYING PLURALITY OF CONDUCTING DEVICES TO SHARE LOAD CURRENT

Charles C. Ih, Philadelphia, Pa., assignor to Sperry Rand Corporation, New York, N.Y., a corporation of Delaware Filed Dec. 11, 1961, Ser. No. 158,260

10 Claims. (Cl. 307—88.5)

This invention relates to amplifying-switching circuits and more particularly to an amplifier-switching circuit which provides multiple current paths to share a relatively large load current.

In a multiple stage amplifier-switching circuit, the output current is often limited by the current carrying capacity of the valve element (i.e. tube, transistor, etc.) in the last stage. As a means of circumventing this limitation the present invention provides multiple current conducting paths which share the load current, while the valve elements in such paths may have relatively small individual current carrying capacities compared to the overall load current.

Accordingly it is an object of the present invention to provide an improved amplifier-switch.

It is another object of the present invention to provide an improved amplifier-switching circuit which provides multiple current conducting paths connected to the load to share the load current.

It is an additional object of the present invention to provide an amplifier-switching circuit which provides a voltage regulator means connected to the load to regulate the output current.

A further object of the present invention is to provide a relatively fast amplifier-switching circuit.

In accordance with a feature of the present invention there is provided at least first and second transistors common connected at their collectors to the load, the emitter of the first transistor being connected to the base of the second transistor, and a diode, whose voltage-current characteristic substantially matches the Vbe-Ie characteristic of the second transistor, connected in series with a resistor between the base of the second transistor and a common terminal. The emitter of the second transistor is also connected through a resistor to the common terminal.

In accordance with another feature of the present invention there is provided a third transistor whose emitter is connected through a diode to the base of said first transistor mentioned in the above feature and whose collector is connected to said common terminal. This third transistor has a voltage developing means connected to its emitter, the voltage developed thereby regulating the voltage which can be applied to the base of said first transistor.

In accordance with another feature of the present invention there is provided an inductance impedance connected between the base of the first transistor mentioned above and the common terminal mentioned above, the inductance impedance serving to provide clean-up current to neutralize the minority carriers in said first and second transistors, when said transistors are turned off thereby effecting a fast switching operation.

In accordance with another feature of the present invention there is provided a pair of cascaded transistors in first stage of the circuit which serve to amplify an input signal thereto and provide an output signal therefrom which is applied to the base of said first transistor.

The above-mentioned and other features and objects of this present invention will become more apparent by reference to the following description taken in conjunction with the accompanying drawing wherein:

The figure is a schematic of the present invention.

Consider a general description of the circuit in connection with the figure. The circuit as shown can be considered in two halves or two stages. The first half consists of the cascaded transistors TR1 and TR2 and the auxiliary circuit components which are connected thereto. The purpose of the first half of the circuit is to amplify a relatively small input signal which is applied to the input element 11 in order to provide a substantially larger output current signal to be applied to the base 13 of the transistor TR3. The second half of the circuit includes the transistors TR3 and TR4 as well as the regulating transistor TR5. The second half of the circuit operates such that the load current, that is the current passing across the resistor 41, is shared by the transistors TR3 and TR4. In a preferred embodiment the load current is shared equally by the transistors TR3 and TR4, the explanation of which will be considered hereinafter. The regulating transistor TR5, in conjunction with the diode 71, regulates the amount of current that is applied to the base 13 of transistor TR3 and its operation will be fully discussed hereinafter. Since the present arrangement provides a parallel circuit path or multiple circuit paths to share the load current, it becomes obvious that a large output current can be provided and yet the respective current carrying capacities of the valve elements, or transistor devices, employed can individually be considerably lower than the output current. In this way increased life is provided for the circuit and an economic advantage is gained since the output current is not limited by the current carrying capacity of a large and costly valve element.

Consider now in detail the operation of the circuit depicted in the figure. An input signal is applied to the base element 11 which causes the transistor TR1 to conduct. Although the transistors TR1 and TR2 are shown as PNP type transistors it should be readily understood that they might well be NPN transistors if the polarities are reversed. A negative input signal applied to the input element 11 causes transistor TR1 to conduct. Current flows from the ground potential source 15, through the resistors 17, through the transistor TR1 to the minus voltage source 19. In order to keep the transistor TR1 from going to saturation, which would place a limitation on a fast switching operation, there is provided a clamping circuit. The clamping circuit includes the diode 21. If the input signal current should go more negative than —3 volts (which would drive the transistor TR1 to saturation), the clamping circuit provides additional current and prevents the transistor TR1 from going to saturation. In addition in the first half of the present arrangement there is included a circuit to provide clean-up current which includes the inductance winding 23 and the resistor 25. When the first half of the circuit is turned on (transistors TR1 and TR2 conducting) there is current flowing from the ground through the resistor 25 through the winding 23 into the base element 11. When the transistor TR1 is turned off the inductance winding 23 acts as a current source and attempts to conduct current around the loop from the upper end of the winding, through the base element to the emitter, across the resistor 17 to ground, through the resistor 25 back to the other side of the winding 23. In this way the minority carriers in the transistor TR1 are neutralized as soon as the transistor TR1 is turned off.

With the transistor TR1 conducting there is current flow as indicated earlier from ground source 15 across the resistor 17 thereby providing a relatively negative voltage to the base element 27 of the transistor TR2. The negative potential at the base element 27 of transistor TR2 turns on the transistor TR2 and causes current conduction from the ground potential source 29 through the resistor 31 through the transistor TR2 to the base element 13 of the transistor TR3, across the inductance winding 33 across the resistor 35 to the minus potential source 37. In this way the input signal has been amplified by the transistors TR1 and TR2 to provide a relatively large input current to the base element 13 of transistor TR3.

With the transistor TR2 conducting there is a voltage applied to the base 13 which is slightly negative with respect to ground in accordance with the voltage drop across the resistor 31 across the transistor TR2 and across the resistor 32. However, this slightly negative voltage is sufficiently positive to turn on the transistor TR3 and hence there is current conduction from the ground source 39, through the load resistor 41 through the transistor TR3 through the diode 43 through the resistor 45 to common terminal 47 which is connected to the negative voltage source 37. Since there is current flow from the emitter of transistor TR3 across the diode 43 and across the resistor 45 there is a relatively positive potential applied to the base element 49 of the transistor TR4. With the relatively positive potential applied to the base element 49 the transistor TR4 is turned on and the current conducts from the ground potential source 39 through the load resistor 41 through the transistor TR4 and across the resistor 51 to the common terminal 47.

It is of special interest to note that the diode 43 is chosen such that the voltage-current characteristic substantially matches the voltage-current characteristic ($Vbe$–$I_e$) of the transistor TR4. In effect then the diode 43 simulates the base-to-emitter junction of the transistor TR4. Since the diode 43 simulates the base-to-emitter junction of the transistor TR4 it follows that a voltage which is developed at the emitter of transistor TR3 is applied to the common connection of the anode of diode 43 and the base 49 and results in causing the equal current flow across the resistor 45 and across the resistor 51. If the current flow across the resistor 45 and 51 are equal then it follows that the emitter currents are substantially equal and hence the collector currents are substantially equal thereby effecting a multiple path circuit which equally shares the load current.

The inductance winding 33 and the resistor 35 provide a low impedance path which serves to initially keep the transistor TR3 off and also serves to provide the clean-up current when the transistors TR3 and TR4 are turned off. When the two last-mentioned transistors are conducting there is current flow from the base 13 through the inductance winding 33 across the resistor 35 to the common terminal 47 which is connected to the minus voltage potential 37. When this current is terminated the inductance winding 33 acts as a current source and transmits current around the loop from the lower end of the winding 33 through the resistor 35 through the resistor 45 through the resistor 53 and across the emitter-base junction back to the other side of the winding 33. A similar loop is provided for the transistor TR4 with the current passing through the resistor 51 and across the emitter base junction to the base 49. In this way the minority carriers in the transistors TR3 and TR4 are neutralized and help effect a faster switching operation.

Connected to common terminal 47 is a Zener diode 55 which is further connected to a resistor 57 to a ground potential source 59. The Zener diode is biased to continually conduct and therefore there is a constant voltage developed between the upper terminal of the resistor 57 and the common terminal 47. The resistor 61 is connected across the Zener diode 55 and therefore has a constant potential applied thereacross. The base element 63 is connected to a tap or a position on the resistor 61 to provide a constant voltage to the base of the transistor TR5. Connected to the emitter 65 of the transistor TR5 is a resistor 67, which is further connected to a ground potential 69. Since the collector of the transistor TR5 is connected to the common terminal 47 which is further connected to the minus voltage source 37 and since there is a relatively negative voltage with respect to the emitter voltage applied to the transistor TR5, the transistor TR5 is continually conducting. With the transistor TR5 continually conducting there is a constant voltage developed at the emitter terminal 65 which in turn acts through the diode 71, as a clamp to the base element 13 of the transistor TR3. In this way if there is a voltage, which is more positive than the voltage developed at the emitter terminal 65, applied to the base element 13 the excess or difference signal conducts across the diode 71 and through the constantly conducting transistor TR5. The A.C. component of such an excess signal is transmitted to ground through the by-pass capacitor 73.

A careful study of the above circuit reveals that by providing the diode 43 with a voltage-current characteristic matching that of the $V_{be}$–$Ie$ characteristic of the transistor TR4, the load current is equally shared between the two current carrying paths one each of which includes respectively the transistors TR3 and TR4. Although only two transistors are shown as carrying the load current it should be fully understood that many other transistors could be so arranged in such a circuit so that each shares an equal portion of the load current. By changing the values of the resistors 45 and 51 the current sharing circuits can share the load in a predetermined ratio if for some reason this particular arrangement is desirable. Further study of the circuit reveals that the regulating transistor TR5 which is continually conducting serves to keep the applied signal to the base 13 below a certain positive value and therefore the output current is regulated. The inclusion of the inductance winding 33 provides for a fast clean-up and hence a fast switching circuit.

While I have described above the principles of my invention in connection with specific apparatus, it is to be clearly understood that this description is made only by way of example and not a limitation to the scope of my invention as set forth in the objects thereof and in the accompanying claims.

What is claimed is:

1. A switching circuit for providing a large output current comprising:
an output means for said switching circuit;
at least first and second transistors each having an input element,
an output element,
and a control element, said control element forming a junction with said output element and another junction with said input element,
input circuitry means for receiving input signals coupled to the control element of said first transistor; the output element of said first transistor coupled to the control element of said second transistor;
the input elements of each of said first and second transistors connected to said output means of said switching circuit a first resistor having first and second terminals; a second resistor having first and second terminals;
a two terminal non-linear impedance means having its first terminal coupled to the control element of said second transistor,
said two-terminal non-linear impedance means having a voltage-current characteristic as measured from its first terminal to its second terminal which is substantially identical to the voltage-current characteristic across the control element to output element junction of said second transistor;
and the second terminal of said two-terminal non-linear impedance means connected to said first terminal of said first resistor;
the output element of said second transistor connected to said first terminal of said second resistor; said second terminal of said first and second resistors being connected to form a common terminal,
said first and second resistors being of equal resistance value,
said common terminal adapted to be connected to a potential thereby enabling each of said current devices to share the output current equally.

2. A switching circuit for providing a large output current comprising:

an output means for said switching circuit;

at least first, second and third conducting devices each having an input element, an output element, and a control element said control element forming a junction with said output element and another junction with said input element; the output element of said first current conducting device coupled to the control element of said second current conducting device, the input elements of each of said first and second current conducting devices common connected to said output means of said switching circuit;

a two terminal non-linear impedance means having its first terminal connected to the control element of said second current conducting device, said two-terminal non-linear impedance means having a voltage-current characteristic as measured from its first terminal to its second terminal which is substantially identical to the voltage-current characteristic across the control element to output element junction of said second current conducting device;

the second terminal of said two-terminal non-linear impedance means circuitry-connected with the output element of said second current conducting device to form a common terminal, said common terminal adapted to be connected to a potential source thereby enabling each of said current conducting devices to share the output current according to a predetermined ratio;

third conducting device having its output element connected to said common terminal and by circuitry means to said control element of said first current conducting device; a constant voltage means connected between said common terminal and said input element of said third current conducting device, said constant voltage means having at least one tap thereon connected to the control element of said third current conducting device;

a undirectional current conducting device having one terminal connected to a control element of said first current conducting device and its other terminal connected to the input element of said third element conducting device;

and voltage developing means connected to the input element of said third current conducting device to provide a voltage thereat which is the voltage desired at the control element of said first current conducting device and thereby providing that if the voltage applied to the control element of said first current conducting device exceeds the desired voltage, the excessive portion of the applied signal is transmitted through said undirectional current conducting device and through said third current conducting device to said common terminal.

3. A switching circuit according to claim 2 wherein said first, second and third current devices are transistors.

4. A switching circuit according to claim 3 wherein said circuitry means comprises to provide a clean-up current to neutralize the minority carriers in said first and second current conducting devices when said last-mentioned current conducting devices are turned off.

5. A switching circuit for providing a large output current comprising:

an output means for said switching circuit;

at least first and second, and third transistors each having an input element, an output element, and a control element said control element forming a junction with said output element and another junction with said input element;

the output element of said first transistor coupled to the control element of said second transistor, the input elements of each of said first and second transistors common connected to said output means of said switching circuit; a first resistor having first and second terminals; a second resistor having first and second terminals;

a two terminal non-linear impedance means having its first terminal coupled to the control element of said second transistor, said two-terminal non-linear impedance means having a voltage-current characteristic as measured from its first terminal to its second terminal which is substantially identical to the voltage-current characteristic across the control element to output element junction of said second transistor;

the second terminal of said two-terminal non-linear impedance means connected to said first terminal of said first resistor;

the output element of said second transistor connected to said first terminal of said second resistor;

said second terminals of said first and second resistors being connected to form a common terminal, said resistors being substantially equal valued;

said common terminal adapted to be connected to a potential source thereby enabling each of said transistors to equally share the output current;

a constant voltage means connected to the control element of said third transistor;

the output element of said third transistor connected to said common terminal;

a unidirectional current conducting device connected to the control element of said first transistor and further connected to the input element of said third transistor;

a voltage developing means connected to the input element of said third transistor to provide a voltage thereat which is equal to the preferred voltage value of the control signal to be applied to said control element of said first transistor, thereby providing that if the voltage value of an applied signal exceeds said preferred value the difference signal will be transmitted through said unidirectional current conducting device and through said third transistor to said common terminal; and an inductance means coupled between the control element of said first transistor and said common terminal to provide clean-up current to neutralize the minority carriers in said first and second transistors when said last-mentioned transistors are turned off.

6. A switching circuit for providing a large output current comprising:

an output means for said switching circuit;

at least first and second current devices each having an input element, an output element, and a control element said control element forming a junction with said output element and another junction with said input element;

the output element of said first current conducting device coupled to the control element of said second current conducting device, the input elements of each of said first and second current conducting devices common connected to said output means of said switching circuit;

a two terminal non-linear impedance means having its first terminal coupled to a control element of said second current conducting device, said two-terminal non-linear impedance means having a voltage-current characteristic as measured from its first terminal to its second terminal which is substantially identical to the voltage-current characteristic across the control element to output element junction of said second current conducting device;

the second terminal of said two-terminal non-linear impedance means circuitry-coupled with the output element of said second current conducting device to form a common terminal, said common terminal adapted to be connected to a current conducting device, the input element of said current conducting devices to share the output current according to a predetermined ratio;

at least third and fourth current conducting devices each having an input element, an output element, and a control element;

the input element of said third current conducting device coupled to the control element of said fourth current conducting device said output element adapted to be connected to a second potential source;

the output element of said fourth current conducting device coupled to the control element of said first current conducting device, the input element of said fourth current conducting device connected to a reference potential;

input circuitry means coupled to the control element of said third current conducting device to enable an input signal to be applied thereto which in turn is amplified through said third and fourth current conducting devices and applied to the control element of said first current conducting device.

7. A switching circuit according to claim 6 wherein there is further included a clamping circuit connected to the control element of said third current conducting device to keep said third current conducting device from saturating.

8. A switching circuit according to claim 7 wherein there is further included a fifth current conducting device having a control element, an input element, and an output element;

the output element of said fifth current conducting device connected to said common terminal;

a unidirectional current conducting device having first and second terminals with said first terminal thereof connected to the control element of said first current conducting device and the second terminal thereof connected to the input element of said fifth current conducting device;

and a voltage developing means connected to the input element of said fifth current conducting device providing a voltage thereto which is equal to the desired voltage to be applied to the control element of said first current conducting device so that if an input signal is applied thereto which exceeds a desired voltage the difference therebetween is conducted through the unidirectional current conducting device and through said fifth current conducting device to said common terminal.

9. A switching circuit according to claim 8 wherein there is a constant voltage source connected to the control element of said fifth current conducting device.

10. A switching circuit according to claim 9 wherein each of said current conducting devices is a transistor and there is further included an inductance means in series with a resistor connected to between the control element of said first current conducting device and said common terminal to provide a clean-up current to said first and second current conducting devices to neutralize the minority carriers therein when said first and second current conducting devices are turned off.

References Cited by the Examiner

UNITED STATES PATENTS 3,039,009 6/62 Gray et al. -------- 307—88.5/10

ARTHUR GAUSS, *Primary Examiner.*

UNITED STATES PATENT OFFICE
CERTIFICATE OF CORRECTION

Patent No. 3,192,399 June 29, 1965

Charles C. Ih

It is hereby certified that error appears in the above numbered patent requiring correction and that the said Letters Patent should read as corrected below.

Column 5, lines 44 and 57, for "undirectional", each occurrence, read -- unidirectional --; column 7, line 4, for "current conducting device, the input element of said" read -- first potential source thereby enabling each of said --; column 8, line 23, strike out "to".

Signed and sealed this 22nd day of February 1966.

(SEAL)
Attest:

ERNEST W. SWIDER
Attesting Officer

EDWARD J. BRENNER
Commissioner of Patents